(12) United States Patent
Smith et al.

(10) Patent No.: US 7,815,957 B2
(45) Date of Patent: Oct. 19, 2010

(54) CHEESE COMPOSITIONS AND RELATED METHODS

(75) Inventors: Erika B. Smith, Champlin, MN (US); Larry M. Rasmussen, Plymouth, MN (US); Melissa A. Haase, Burnsville, MN (US); David M. Walsh, Edina, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 849 days.

(21) Appl. No.: 11/376,047

(22) Filed: Mar. 15, 2006

(65) Prior Publication Data
US 2006/0159825 A1 Jul. 20, 2006

Related U.S. Application Data

(63) Continuation-in-part of application No. 10/715,734, filed on Nov. 17, 2003.

(51) Int. Cl.
*A23C 19/00* (2006.01)
(52) U.S. Cl. .................. 426/582; 426/580; 426/656; 426/661
(58) Field of Classification Search ............ 426/580, 426/582, 585, 601, 656, 657, 658, 661
See application file for complete search history.

(56) References Cited

U.S. PATENT DOCUMENTS

| | | | |
|---|---|---|---|
| 3,741,774 | A | 6/1973 | Burkwall, Jr. |
| 3,836,677 | A | 9/1974 | Freck et al. |
| 4,369,196 | A | 1/1983 | Sukegawa |
| 4,499,116 | A | 2/1985 | Zwiercan et al. |
| 4,608,265 | A | 8/1986 | Zwiercan et al. |
| 4,937,091 | A | 6/1990 | Zallie et al. |
| 5,725,676 | A | 3/1998 | Chiu et al. |
| 5,807,601 | A | 9/1998 | Carpenter et al. |
| 5,932,017 | A | 8/1999 | Chiu et al. |
| 6,231,675 | B1 | 5/2001 | Chiu et al. |
| 6,322,841 | B1 | 11/2001 | Jackson et al. |
| 6,451,121 | B2 | 9/2002 | Chiu et al. |

FOREIGN PATENT DOCUMENTS

| | | |
|---|---|---|
| EP | 0 115 617 B1 | 8/1986 |
| EP | 0 278 179 B1 | 1/1992 |

OTHER PUBLICATIONS

Mounsey, et al, 2001, Characteristics of Imitation Cheese Containing Native Starches, *Journal of Food Science*, vol. 66, No. 4, pp. 586-591.
Fox, et al, 2000, Processed Cheese and Substitute or Imitation Cheese Products, *Fundamental of Cheese Science*, Aspen Publishers, Inc., Chapter 18, pp. 429-451.
Anonymous, 1981, Cheese analog contains protein from four sources-dairy, oilseed, cereal, leaf, *Food Processing*, vol. 42, No. 11, pp. 28-29.
Hesser, 1983, Wheat Gluten—A Natural Protein for the Future—Today, Amino Acid Composition and Biological Value of Cereal Proteins, *Proceedings of the International Association for Cereal Chemistry Symposium on Amino Acid Compositions and Biological Value of Cereal Proteins*, pp. 529-542.
Magnuson, 1985, Uses and Functionality of Vital Wheat Gluten, *Cereal Foods World*, vol. 30, No. 2 pp. 179-181.
Hessr, 1989, World Food Uses of Vital Wheat Gluten, Vegetable Protein Utilization in Human Foods and Animal Feedstuffs, *Proceedings the World Congress*, pp. 116-122.

*Primary Examiner*—Leslie Wong
(74) *Attorney, Agent, or Firm*—Arlene L. Hornilla; Paul J. Parins

(57) ABSTRACT

Cheese compositions and methods of making cheese compositions, including methods of formulating cheese compositions are provided. Cheese compositions of the invention include casein protein, non-casein protein, non-pregelatinized, modified starch, and a fat component having a low amount of trans-fat (e.g., about 5% or less of trans-fat by weight of the fat component) while at the same time substantially maintaining and/or improving properties (e.g., processing properties, organoleptic properties, combinations of these, and the like) of the cheese composition.

22 Claims, 6 Drawing Sheets

CHEESE COMPOSITIONS AND RELATED METHODS

RELATED APPLCIATIONS

This patent Application is a continuation-in-part of and is entitled to the benefit of the filing date of prior patent application Ser. No. 10/715,734, filed on Nov. 17, 2003, by Huang et al. and titled CHEESE COMPOSITIONS AND RELATED METHODS, which is hereby incorporated by reference.

FIELD OF INVENTION

The invention relates to cheese compositions, methods of making cheese compositions, and food products that include such cheese composition(s). In particular, the invention is directed to cheese compositions at a stage during manufacture and/or cheese compositions as final cheese products that include a fat component low in trans-fat content, food products that include such cheese composition(s), and methods of making such cheese composition(s) and food product(s).

BACKGROUND OF THE INVENTION

Incentives (e.g., economic incentives) can result by replacing or substituting an amount (e.g., either complete or partial replacement) of one or more certain ingredients in cheese compositions with other (e.g., less expensive) ingredients.

However, replacing a conventional cheese composition ingredient can present one or more technical hurdles because cheese compositions are complex compositions and their properties can be sensitive to (i.e., require) the presence and/or amount of certain ingredients. Thus, conventional cheese manufacturing has come to rely on certain cheese composition ingredients to provide certain properties. Exemplary technical challenges include finding a substitute ingredient that can provide a cheese composition with one or more suitable functional properties (e.g., melt, stretch, and firmness), organoleptic properties (e.g., texture and flavor), and nutritional properties.

One ingredient in cheese compositions that has been targeted for a reduced presence is casein protein. In particular, casein protein has been targeted to be reduced in quantity by using a less expensive ingredient. Casein protein is a protein, naturally found in milk that can provide a cheese composition with one or more of functional, organoleptic, and nutritional properties. It can be replaced (e.g., reduced in amount) by substituting an amount of casein in a cheese composition with an amount of certain type of starch.

However, the ability to replace casein protein with starch can be significantly limited depending on the desired functional, organoleptic, and/or nutritional properties of the cheese composition. For example, replacing casein with starch can provide a cheese composition with less than desired functional properties (e.g., melt, stretch, and firmness) because starch is not necessarily always a "functional" replacement of casein protein, but can merely replace a certain mass of casein protein. Similarly, starch can impart a different, sometimes less desirable, flavor and/or texture to the cheese composition than provided by casein. Furthermore, replacing casein protein with starch, a carbohydrate, can significantly alter the nutritional characteristics of a cheese composition (e.g., the cheese composition may not satisfy nutritional standards imposed by the United States Department of Agriculture). Thus, conventional cheese making has come to rely on the mere presence and sometimes quantity of casein protein to provide certain cheese composition properties.

Despite these limitations, there exists a strong desire (e.g., economic incentives) to further reduce the amount of casein protein in certain cheese compositions. However, providing suitable functional, organoleptic, and nutritional characteristics while reducing the casein protein even further in certain cheese compositions presents significant technical challenges.

Another ingredient that is commonly found in cheese compositions is shortening, which often contains trans fat. In general, recent consumer trends indicate that trans-fatty acids (i.e., "trans-fat") in food products and food intermediates are being avoided by consumers to help increase the healthfulness of their diet. Accordingly, many food product marketers are finding ways to provide consumers with food products having reduced and/or substantially no trans-fat content.

Trans-fat is an unsaturated fatty acid in which the hydrogen atoms of a double bond (or unsaturation) are on opposite sides of the molecule. The trans isomer of the fatty acid causes the carbon chain to assume a straight-chain configuration similar to that of a saturated fat. Trans fatty acids are primarily formed through the metal-catalyzed process of hydrogenation, however they have also been found to form naturally and is found at low levels in cow's milk. By hydrogenating oils through industrial processing, hydrogen atoms are added to unsaturated sites on fatty acids, creating a larger population of saturated fats in the oil. In a partially-hydrogenated oil, some of the unsaturated fatty acids remain. However, the processing causes some of the double-bonds of the unsaturated fatty acids to undergo isomerization from the cis configuration to the trans configuration.

Partial hydrogenation of fats was introduced into the U.S. food supply beginning in 1910. The practice was put into widespread use in the 1940's in order to make semisolid fat products. The process of hydrogenation raises the melting point of a fat and increases the solid fat content. Such fats having higher melting points and solid fat content help provide food compositions (e.g., cheese compositions) with highly desirable functional properties. For example, oils containing trans-fats can help a cheese composition to have highly desirable properties (e.g., melt, crumble, stretch, firmness, combinations of these, and the like) at one or more temperatures (e.g., shred temperature, temperature of a consumer's mouth, combinations of these, and the like). In addition, the stability of the fat is greatly enhanced through hydrogenation by reducing susceptibility to oxidation and subsequent rancidity. Therefore, positive contributions to processing properties, shelf-life, texture, and taste of food products (e.g., cheese compositions and food products incorporating such cheese compositions) are imparted by hydrogenated and partially hydrogenated fats.

A recent consumer trend is to avoid consuming food products that are high in, or have an undue amount of, trans-fat. To help meet consumer demand many food manufacturers would like to provide consumers with food products (e.g., cheese compositions and food products that include cheese (e.g., snack food (e.g., frozen snack food) including pizza, pizza-type snack food, and the like)) having a low amount of trans-fat (e.g., about 5% or less by weight of trans-fat based on the total weight of the fat component). However, changing the formulation of a food composition to accommodate this can present significant technical hurdle(s) because of the reliance specifically on trans-fat containing ingredients to provide one or more highly desirable properties in food products and food product intermediates. Changing the trans-fat content of a food product can significantly impact properties such as processing properties, organoleptic properties, combinations of these, and the like, of the food product. As mentioned above, cheese compositions are complex chemical compositions, therefore its properties (e.g., melt, crumble, stretch, firmness, combinations of these, and the like) could be unduly affected by changes in formulation amounts and/or ingredient(s) that would affect trans-fat content. Accordingly, there is a strong need to provide cheese compositions having a low amount of trans-fat (e.g., about 5% or less by weight of trans-fat based on the total weight of the fat component) while at the same time substantially maintaining and/or improving cheese composition properties such as melt, crumble, stretch, firmness, combinations of these, and the like. In addition, there is a strong need to provide food product(s) including such cheese compositions and methods of making such cheese compositions and food products.

SUMMARY

It has been discovered that a unique combination of protein and starch provides a cheese composition that has excellent flexibility with respect to formulation changes because the resulting cheese composition can exhibit substantially the same or improved properties (e.g., functional/processing properties, organoleptic properties, combinations of these, and the like) over a range of significantly different cheese formulations.

Advantageously, the present invention allows cheese compositions to have unconventionally reduced amounts of casein protein while still providing one or more suitable functional, organoleptic, and nutritional properties. More specifically, certain cheese compositions of the invention are characterized as having an amount of casein protein replaced with a combination of ingredients including an amount of non-casein protein (e.g., non-dairy protein such as vital wheat gluten) and an amount of non-pregelatinized, modified starch (e.g., non-pregelatinized, thermally-inhibited starch). This unique combination of certain protein and starch can provide cheese compositions (preferably substitute cheese compositions) characterized as having one or more suitable functional, organoleptic, and nutritional properties even as the level of casein protein is reduced to levels otherwise known to decrease such desired properties. Suitable functional qualities of a cheese composition of the present invention can include qualities typical of any given cheese composition. For example, important qualities of certain mozzarella cheese compositions used on pizza can include machinability during manufacture, depositing performance, freeze/thaw stability, melt, stretch, pizza bake performance, taste, and color. Other important qualities include qualities of a cheese composition during one or more stages of processing such as, for example, emulsification. Additionally, cheese compositions of the invention can be less sensitive to casein protein quality in that emulsification during cheese processing can be enhanced by use of one or more particular starches such as non-pregelatinized, thermally-inhibited starch.

According to one aspect of the invention, a cheese composition includes a fat component, a protein component, a starch component, an emulsifying salt component, and a water component. The protein component includes casein protein and a casein-replacing amount of non-casein protein. The starch component includes a casein-replacing amount of non-pregelatinized, modified starch.

A suitable fat component has about 5% or less by weight of trans-fat based on the total weight of the fat component. Fat sources having about 2% or less by weight of trans-fat, based on the total weight of the fat component can also be used. Exemplary suitable fat ingredient for use in a cheese composition include but are not limited to palm oil, palm oil fractions with blends of unsaturated, non-hydrogenated oil types, combinations of these, and the like. Cheese compositions according to the invention also include a protein component (preferably casein protein and non-casein protein) and a starch component (preferably non-pregelatinized, modified starch). Preferred modified starch includes non-pregelatinized, thermally-inhibited starch and preferred non-casein protein includes vital wheat gluten.

According to another aspect of the invention, a method of formulating a cheese composition includes a step of reducing an amount of a casein protein in a formulation by incorporating a non-casein protein into the formulation for the composition based upon information comprising functional characteristics of the non-casein protein and incorporating a non-pregelatinized, modified starch into the formulation for the composition based upon information comprising data indicative of a viscosity characteristic of the non-pregelatinized, modified starch.

According to yet another aspect of the invention, a method of making a cheese composition includes the steps of formulating a cheese composition, combining and mixing the components to form a mixture, and heating and cooling the mixture to provide a cheese composition. The components include a fat component, a protein component, a starch component, an emulsifying salt component, and a water component. The protein component includes casein protein and a casein-replacing amount of non-casein protein. The starch component includes a casein-replacing amount of non-pregelatinized, modified starch.

As mentioned above, there is also a strong need to provide cheese compositions having a low amount of trans-fat (e.g., about 5% or less by weight of trans-fat based on the total weight of the fat component) while at the same time substantially maintaining and/or improving cheese composition properties such as melt, crumble, stretch, firmness, combinations of these, and the like. However, it has been discovered that certain cheese compositions do not have the ability to allow their trans-fat content to be reduced to a suitable level because the melt and/or brittleness (i.e., machinability) are affected to an undue degree.

However, it has been discovered that a unique combination of casein protein, non-casein protein, and non-pregelatinized, modified starch, surprisingly allows cheese compositions to include a fat component having reduced amounts of trans-fat (e.g., about 5% or less of trans-fat by weight of the fat component) while at the same time maintaining and/or substantially improving properties (e.g., processing properties, organoleptic properties, combinations of these, and the like) of the cheese composition. For example, a unique combination of certain protein and starch according to the invention surprisingly allows a conventional fat component ingredient such as partially hydrogenated soybean oil (approximately 35% trans-fat) to be partially or wholly replaced with a different fat ingredient that is much lower in trans-fat such as palm oil (approximately 2% or even 1% trans-fat) while at the same time substantially maintaining and/or improving very important cheese properties (e.g., melt, crumble, stretch, firmness, combinations of these, and the like). This is very significant especially since, as discussed above, other cheese compositions are unable to make a similar substitution because properties such as melt and/or brittleness are impacted to an undue degree.

According to one aspect of the invention, a cheese composition includes a fat component, a protein component, and a starch component. The fat component has about 5% or less by weight of trans-fat based on the total weight of the fat component. The protein component includes a casein protein and a casein-replacing amount of non-casein protein. The starch component includes a casein-replacing amount of non-pregelatinized, modified starch.

According to another aspect of the invention, a method of making a cheese composition includes the step of incorporating a fat component having about 5% or less by weight of trans-fat based on the total weight of the fat component with other cheese composition components to help reduce the trans-fat content of the cheese. The other cheese composition components include a protein component and a starch component. The protein component includes a casein protein and a casein-replacing amount of non-casein protein. The starch component includes a casein-replacing amount of non-pregelatinized, modified starch.

DETAILED DESCRIPTION

Figure 1:
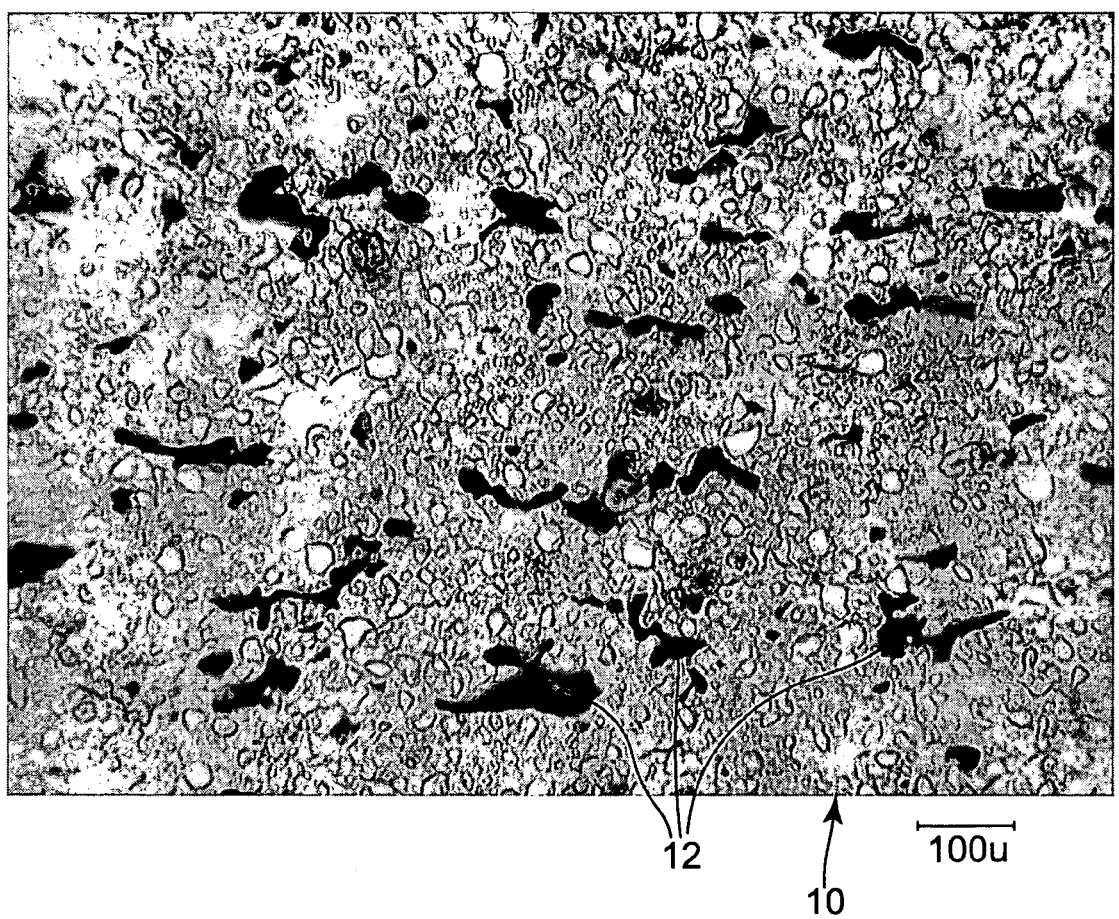
FIG. 1 is a photomicrograph of a cross-sectional view of a cheese composition of the invention that includes non-pregelatinized, thermally-inhibited starch.

In general, cheese compositions may be classified as either natural cheese compositions or non-natural cheese compositions. However, the classification of cheese compositions may vary within the cheese industry.

As used herein, the term "cheese composition" refers to a composition used to make cheese product or the final product of cheese itself. For example, "cheese composition" could refer to a composition during one or more stages of cheese manufacturing, such as when cheese composition ingredients are being mixed together. As another example, "cheese composition" could refer a mixture of cheese ingredients being mixed and heated. Or, as yet another example, "cheese composition" could refer to a composition that is in the form of a final cheese product, ready to be sold for human consumption such as a snack (e.g., the cheese composition could be in the form of shredded cheese, diced cheese, a cheese sauce, combinations of these, and the like).

Natural cheese compositions can be characterized as being made directly from milk. Moreover, the United States Department of Agriculture (USDA) has specific standards for natural cheese compositions including ingredients used, manufacturing procedures used, and final nutritional value. Natural cheese is well known and is commercially available.

Non-natural cheese compositions can include substitute cheese compositions, process cheese substitutes, and imitation cheese compositions.

In general, a "substitute cheese composition," means a product that is a substitute for, and resembles another cheese, yet is not nutritionally inferior. 21 C.F.R. §§101.3 and 102.5, the respective entireties of which references are incorporated herein by reference, defines substitute and imitation food products (e.g., cheese compositions). A substitute mozzarella cheese is further defined by 21 C.F.R. §§133.3, 133.5, and 133.155, the respective entireties of which references are incorporated herein by reference.

As used herein, an "imitation cheese" composition means a cheese composition that resembles another cheese but is nutritionally inferior.

With this in mind, the invention provides cheese compositions having unconventionally reduced amounts of casein protein while providing one or more suitable functional, organoleptic, and nutritional properties. Cheese compositions of the invention are characterized as having an amount of casein protein replaced with a combination of ingredients including an amount of non-casein protein (e.g., non-dairy protein such as vital wheat gluten) and an amount of non-pregelatinized, modified starch (e.g., non-pregelatinized, thermally-inhibited starch). Significantly, cheese compositions of the invention are characterized as having one or more suitable functional, organoleptic, and nutritional properties even as the level of casein protein is reduced to levels otherwise known to decrease such desired properties. Applicants' inventive cheese composition is not necessarily limited to one or more specific cheese composition classification(s), but is directed to a cheese composition generally, wherein it is desired to reduce the casein protein level while providing or maintaining one or more suitable functional, organoleptic, or nutritional properties. Preferred cheese compositions of the invention are "substitute cheese" compositions and "imitation cheese" compositions.

In general, cheese compositions of the invention include mozzarella cheese compositions, cheddar cheese compositions, American cheese compositions, and the like. Preferred cheese compositions include mozzarella substitute cheese compositions. Cheese compositions of the invention can be combined with other ingredients to produce other food products that include cheese (e.g., snack food) including pizza, pizza-type snack food, and the like. Preferred food products include mozzarella substitute cheese compositions of the invention.

In general, cheese compositions of the invention include a protein component, a fat component, and a starch component. Cheese compositions of the invention preferably also include an emulsifying salt component, and a water component. Optionally, cheese compositions of the invention can include various other additives.

A fat component according to the invention can include one or more fat ingredients. The fat component can influence one or more properties of the cheese composition such as melt, crumble, stretch, firmness, final texture, combinations of these, and the like. Fat ingredients are commonly and synonymously referred to as a fat, a shortening, or an oil. Fat can be either liquid or solid at room temperature, or a combination of liquid and solid at room temperature (i.e., semisolid). Useful fat ingredients can include vegetable fat, dairy fat, and combinations thereof. As described in certain embodiments of the invention, fat is typically vegetable fat.

Exemplary fat ingredients include all vegetable fats and oils, individual ingredients or blends thereof, fractionated, interesterified, or fully hydrogenated. Examples of such fat ingredients include hydrogenated coconut oil, cottonseed oil, soybean oil, groundnut oil, palm oil, palm kernel oil, corn oil, canola oil, safflower oil and combinations thereof. These fat ingredients are well known and are commercially available.

In general, a useful amount of fat in a cheese composition of the invention includes an amount that provides suitable properties such as cheese composition texture and melting properties. Such an amount can be in a range from about 15 to about 35% by weight of the total cheese composition, more preferred is an amount in a range from about 20 to about 30% by weight of the total cheese composition.

In certain embodiments, as mentioned above, one or more fat ingredients having low amounts of trans-fat can be incorporated into a certain protein/starch combination of ingredients to provide a cheese composition having extremely low trans-fat content while surprisingly at the same time substantially maintaining and/or improving one or more properties such as melt, crumble, stretch, firmness, final texture, combinations of these, and the like. Such a result is surprising because, e.g., it was previously thought that certain relatively high levels of trans-fat content were needed to achieve suitable values of melt, crumble, stretch, firmness, final texture, combinations of these, and the like.

In certain embodiments, such a low amount of trans-fat includes about 5% or less by weight of trans-fat based on the total weight of the fat component. In other embodiments, the fat component has about 2% or less, about 1.5% or less, about 1.25% or less, about 1% or less, or even about 0.5% or less by weight of trans-fat based on the total weight of the fat component. In certain preferred embodiments, the fat component contains substantially no trans-fat.

Suitable fat ingredients that have such low amounts of trans-fat content according to the invention include palm oil, palm oil fractions, and blends palm oil and/or palm oil fractions with other vegetable oil(s) (e.g., cottonseed oil and/or canola oil). Palm oil and/or palm oil fractions are particularly preferred fat ingredients.

Such fat ingredient(s) having a low amount of trans-fat are readily available on a commercial basis. Suitable low trans-fat ingredients include "soft palm mid fraction" (SPMF) and/or "soft stearin fraction" (SSF). In embodiments, a SPMF and/or SSF fat ingredient has an iodine value (IV) in the range of 40-55, or possibly 45-50. However in some embodiments a fat component can have an IV value as low as 33 (palm stearin) or as high as 60 (palm olein). Procedures for obtaining the iodine value are well-known; such as AOCS Cd 1c-85.

Figure 5:
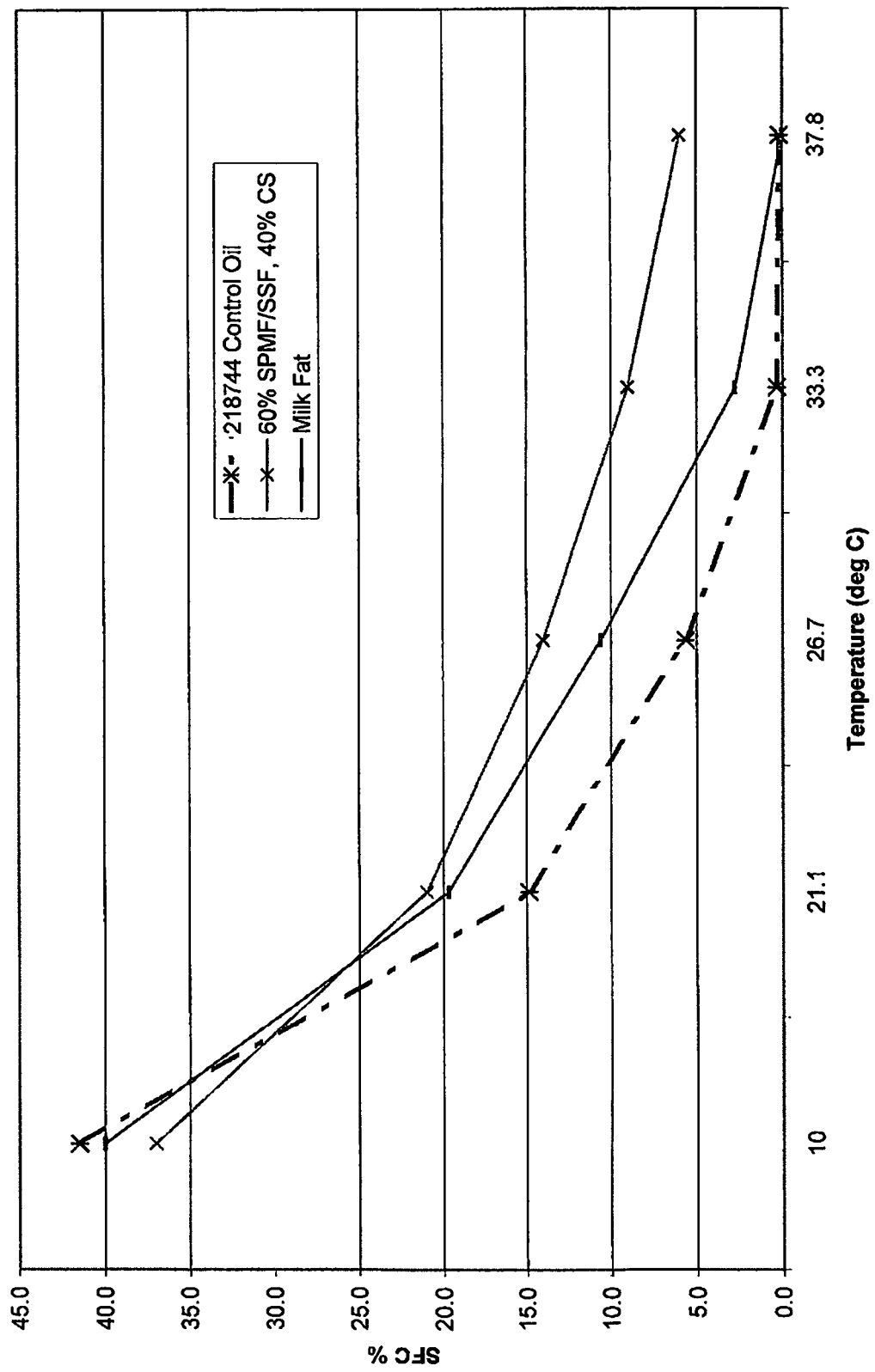
FIG. 5 is a graph showing Solid Fat Content profiles for certain fat ingredients.

As mentioned, in some embodiments a blend of fat ingredients may be used. For example the 60% SPMF/SSF and 40% cottonseed oil blend discussed below with respect to FIG. 5 is a preferred blend of fat ingredients for use in a cheese composition according to the invention.

Preferred fat ingredients having low amounts of trans-fat according to the invention can be identified by, e.g., determining the Solid Fat Content according to the procedure below at one or more temperatures including, for example, shred temperature (e.g., about 4° C.), mouth temperature of a consumer (e.g., about 37.1° C.), combinations of these and the like. In a preferred embodiment, the fat component includes one or more fat ingredients having a Solid Fat Content value in the range from about 30% and 50% at 10 degrees Celsius and less than about 10% at 37.8 degrees Celsius.

Figure 4:
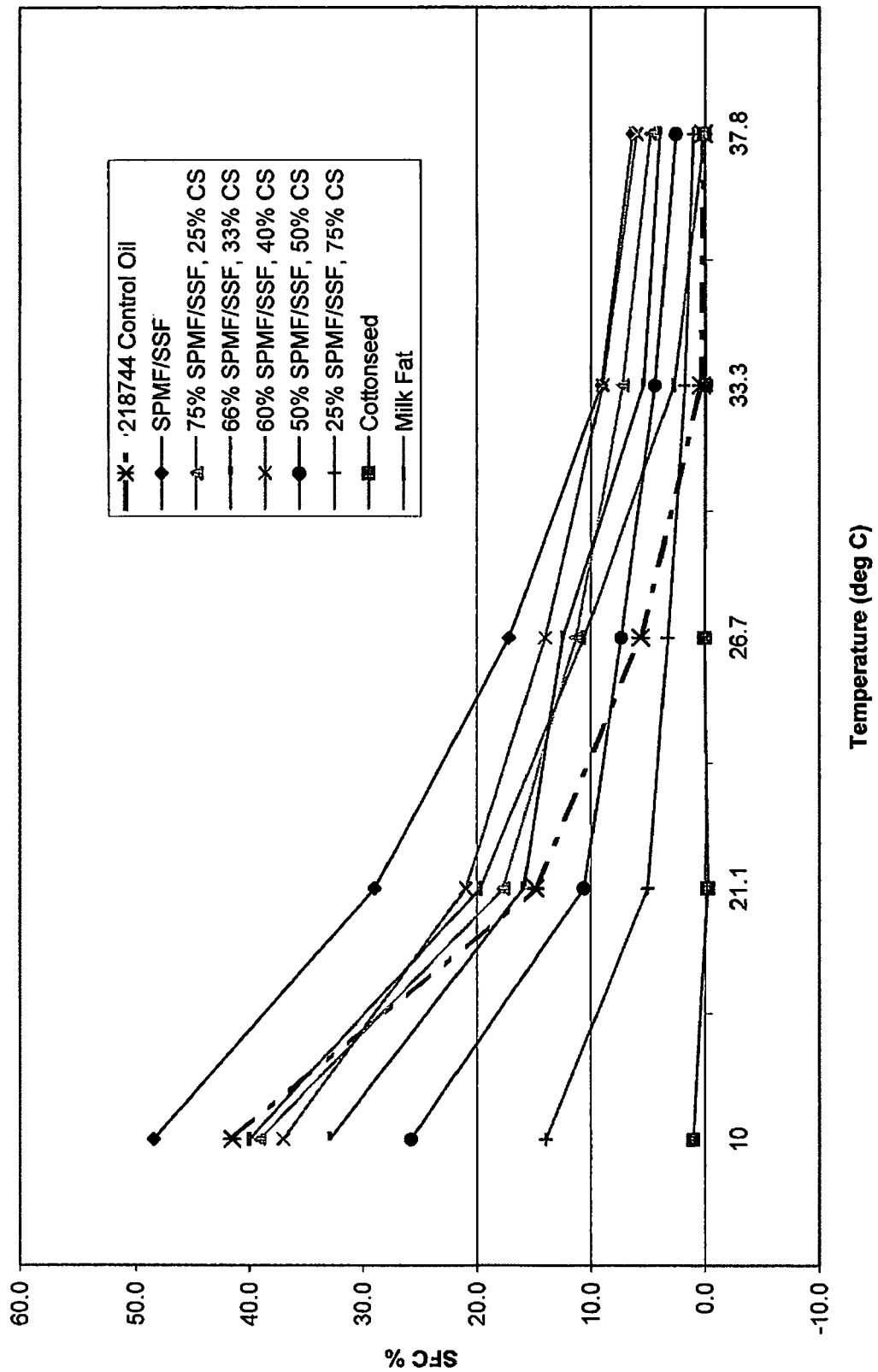
FIG. 4 is a graph showing Solid Fat Content profiles for certain fat ingredients.

FIG. 4 shows a graph of Solid Fat Content profiles that were determined for certain fat ingredients according to the Solid Fat Content procedure described below at various temperatures. The profile for the fat ingredient identified as 218744 Control is an exemplary base-line of a preferred Solid Fat Content profile for a fat ingredient for use in a cheese composition (note: the 218744 Control is relatively high in trans-fat such that it would be unacceptable for use in a cheese composition of the invention). 218744 Control is considered a good base-line for comparison of other fat ingredients because of its similarity in Solid Fat Content profile to that of milk fat which is another exemplary base-line fat ingredient. Accordingly, one or more fat ingredients, including blends of fat ingredients, having an acceptably low level of trans-fat content can have their Solid Fat Content profile compared against a base-line such as 218744 Control to determine whether they would be acceptable as part of a fat component of the invention.

In FIG. 4, the Solid Fat Content profile is shown for the following fat ingredients (including blends of fat ingredients): Control 218744 (partially hydrogenated soybean oil having about 17% saturated fat and about 35% trans-fat and obtained from Golden Foods Golden Brand (Louisville, Ky.); SPMF/SSF (palm oil fractions having about 55% saturated fat and about 1% trans-fat); cottonseed oil (having about 26% saturated fat and about 2% trans-fat and obtained from Bunge Foods, St. Louis, Mo.); milk fat obtained from Grassland Dairy Products, Inc., Greenwood, Wis.; and various blends of cottonseed oil and SPMF/SSF oil. The cottonseed oil/(SPMF/SSF) blends have the following saturated fat and trans-fat content: 25% cottonseed/75% SPMF/SSF blend (47.8% saturated fat and 1.3% trans-fat); 33% cottonseed/66% SPMF/SSF blend (44.9% saturated fat and 1.1% trans-fat); 40% cottonseed/60% SPMF/SSF blend (43.4% saturated fat and 1.4% trans-fat); 50% cottonseed/50% SPMF/SSF blend (40.5% saturated fat and 1.5% trans-fat). A preferred oil blend in FIG. 4 for use in the invention is the blend having 60% SPMF/SSF and 40% cottonseed oil.

FIG. 5 shows another Solid Fat Content profiled for the following fat ingredients described above with respect to FIG. 4: Control 218744, milk fat, and blend having 60% SPMF/SSF and 40% cottonseed oil.

Figure 6:
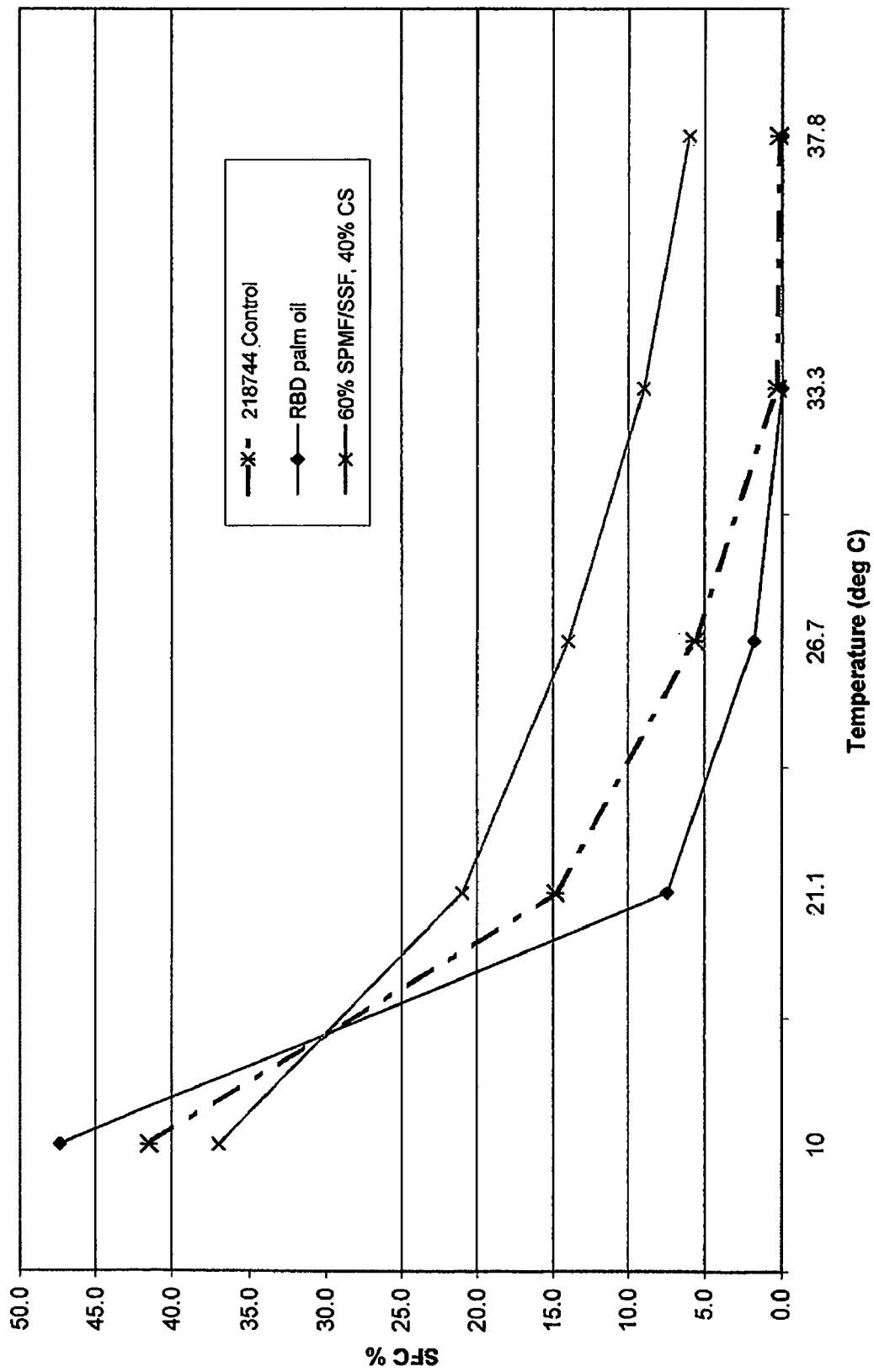
FIG. 6 is a graph showing Solid Fat Content profiles for certain fat ingredients.

FIG. 6 shows another Solid Fat Content profiled for the following fat ingredients: Control 218744 (discussed above), blend having 60% SPMF/SSF and 40% cottonseed oil (discussed above), and a refined, bleached, deodorized (RBD) palm oil (having a trans-fat content of about 1%).

Protein can influence one or more of functional, organoleptic, or nutritional properties of a cheese composition because, e.g., it generally forms a three-dimensional network within a cheese composition. For example, protein can influence melt, stretch, machinability, depositing performance, freeze/thaw stability, pizza bake performance, taste, and color characteristics of a cheese composition. Protein can also influence nutritional characteristics. Proteins that can be used in cheese compositions include dairy proteins like casein protein. Other, non-casein and/or non-dairy proteins can also be used in cheese compositions like vital wheat gluten protein.

Casein protein is an edible protein, that can be found naturally in milk and that is conventionally known to provide many important characteristics in cheese compositions. In fact, it is conventionally thought that a certain amount of casein protein is required to provide certain functional and/or organoleptic properties. As used herein, the term "casein protein" means casein in all its forms, including rennet casein, acid casein, caseinate derivatives, fresh cheese, and dehydrated cheese. In the invention, the preferred form of casein protein includes rennet casein protein.

Methods of making rennet casein protein are well known. Rennet casein can be produced by precipitation of pasteurized skim milk. The precipitation can be accomplished with use of an enzyme called rennin, which can be of animal or microbial origin. Methods of producing and isolating rennet casein from skim milk are well known. Precipitated rennet casein is typically washed, pressed, dried, ground, sieved, and blended to provide a homogenous powder containing approximately 80% casein protein. Rennet casein can be commercially purchased from, for example, suppliers such as Kerry Ingredients, Beloit, Wis.

A useful amount of rennet casein in a cheese composition of the invention includes an amount that can provide a cheese composition with suitable functional properties, organoleptic properties, nutritional properties, and combinations thereof. Such properties may include melt, stretch, machinability, depositing performance, freeze/thaw stability, pizza bake performance, taste, and color of a cheese composition. Protein may also influence nutritional characteristics. Exemplary useful amounts of casein protein in a cheese composition of the invention include amounts in a range from 10-20% by weight of the total cheese composition, preferably 11-18% by weight of the total cheese composition, more preferably 12-18% by weight of the total cheese composition, and even more preferably 13-17% by weight of the total cheese composition.

Non-casein protein includes dairy protein, non-dairy protein, or combinations thereof. According to the invention, non-casein protein and non-pregelatinized, modified starch, in combination, can aid in providing one or more highly desirable functional, organoleptic, or nutritional properties in cheese compositions. Such highly desirable properties can be similar to those conventionally thought only obtainable by using, e.g., an unreduced amount of casein protein, other ingredients such as fat ingredients having a relatively high level of trans-fat content, combinations of these, and the like. Specifically, for example, non-casein protein, in combination with non-pregelatinized, modified starch, can unconventionally replace an amount of casein protein (i.e., act as substitute for casein protein). This combination of starch and protein can also allow the fat component to have a relatively low amount of trans-fat (e.g., such that the fat component includes about 5% or less by weight of trans-fat based on the total weight of the fat component). Non-casein protein can also be conventionally used in cheese compositions of the invention. Preferred non-casein protein includes non-dairy protein.

Non-casein, dairy protein includes protein naturally found in milk. Exemplary non-casein, dairy protein includes whey protein (e.g., whey protein concentrate or isolate).

Suitable non-casein, non-dairy protein includes gluten protein (e.g., vital wheat gluten protein), soy protein, wheat protein, and wheat protein isolate. Preferably, non-casein, non-dairy protein is used in the invention, in combination with non-pregelatinized, modified starch, to make-up for shortcomings in functional, organoleptic, and/or nutritional properties in cheese compositions that can result from a reduced amount of casein protein. This combination of protein and starch can also make-up for shortcomings in functional and/or organoleptic properties in cheese compositions that can result from a low amount of trans-fat. Preferred non-casein, non-dairy protein includes vital wheat gluten.

Non-casein, non-dairy proteins useful in the invention are well known. For example vital wheat gluten is commercially available from, e.g., ADM Food Ingredients, Olathe, Kans., under the trade designation PROVIM ESP. Vital wheat gluten contains approximately 69% gluten protein.

A useful amount of non-casein protein in a cheese composition of the invention includes a "casein-replacing amount of non-casein protein." As used herein a "casein-replacing amount of non-casein protein" means an amount of non-casein protein that, in combination with a suitable non-pregelatinized, modified starch (e.g., non-pregelatinized, thermally-inhibited starch), replaces a given amount of casein protein and provides one or more suitable functional, organoleptic, and nutritional properties. When non-dairy protein is used to replace casein protein, a useful amount of non-dairy protein in a cheese composition of the invention includes a "casein-replacing amount of non-dairy protein." As used herein, a "casein-replacing amount of non-dairy protein" means an amount of non-dairy protein that, in combination with a suitable non-pregelatinized, modified starch (e.g., non-pregelatinized, thermally-inhibited starch), replaces a given amount of casein protein and provides one or more suitable functional, organoleptic, and nutritional properties. The discovery of the impact that non-casein proteins such as non-dairy proteins can have on cheese compositions has numerous advantages. For example, the ability of non-casein proteins such as vital wheat gluten to provide suitable functionality in cheese compositions provides the ability to unconventionally formulate cheese compositions, e.g., with reduced amounts of casein protein and a low amount of trans-fat. Another advantage of this discovery provides the ability to formulate unconventional cheese compositions with reduced amounts of casein protein while providing similar nutritional value as an identical cheese composition having an un-reduced amount of casein protein. Exemplary useful amounts of non-casein protein (including non-dairy protein) in a cheese composition of the invention include amounts in a range from 1-4% by weight of the total cheese composition, preferably 1-3% by weight of the total cheese composition, and even more preferably 1.0-2.5% by weight of the total cheese composition. In one embodiment, non-casein, non-dairy protein can be present in amount of 1.3% by weight of the total cheese composition. In an alternative embodiment, non-casein protein, especially non-dairy protein, can be present in an amount in a range from 2-3% by weight of the total cheese composition. This latter embodiment can use a non-casein, non-dairy protein that includes 69% protein.

Starch can also influence one or more of functional, organoleptic, or nutritional properties of a cheese composition. Applicants have discovered that certain starches can provide excellent formulation flexibility such as, e.g., allowing the fat component to have extremely low amounts of trans-fat and allowing casein protein to be unconventionally reduced to unconventional levels when used in combination with non-casein protein (preferably non-dairy protein).

In particular, non-pregelatinized, modified starch can be used in the invention. As used herein a "modified" starch means that the structure of starch has been modified chemically, thermally, or by other means developed in the future, to alter the viscosity of starch in water. Preferred non-pregelatinized, modified starch includes non-pregelatinized, thermally-inhibited starch.

As a raw material to be used in making cheese compositions, non-pregelatinized, modified starch is typically procured in the form of starch granules.

As used herein, the term "non-pregelatinized," modified starch granule means a starch granule that is insoluble in cold water and appears birefringent when seen under polarized light with a microscope. Non-pregelatinized, modified starch (also known as cook-up starch) tends to gradually thicken upon heating. Pregelatinized starch tends to develop a higher viscosity too quickly for this application. Preferred raw material starch granules include non-pregelatinized, thermally-inhibited starch granules.

During one or more stages of a cheese-making process, non-pregelatinized, modified starch granules can, and typically do become gelatinized. Gelatinization is a series of changes that starch undergoes when heated in excess water, which solubilizes the starch and results in increased viscosity and disappearance of birefringence.

Also, during one or more stages of a cheese-making process, non-pregelatinized, modified starch granules can break down or reduce in size to a certain degree during processing as the result of one or more of heating, mixing, and shearing the granule in a cheese composition. Applicants have discovered that a non-pregelatinized, modified starch that is resistant to such breakdown tends to provide suitable viscosity characteristics during processing. Such a non-pregelatinized, modified starch is likely to satisfy the Starch Viscosity Test (described below). The resistance to granule breakdown results in a starch granule in the final cheese composition that is relatively larger in size (e.g., larger cross-sectional area) as compared to a starch granule that is not as resistant to such breakdown during processing.

Figure 2:
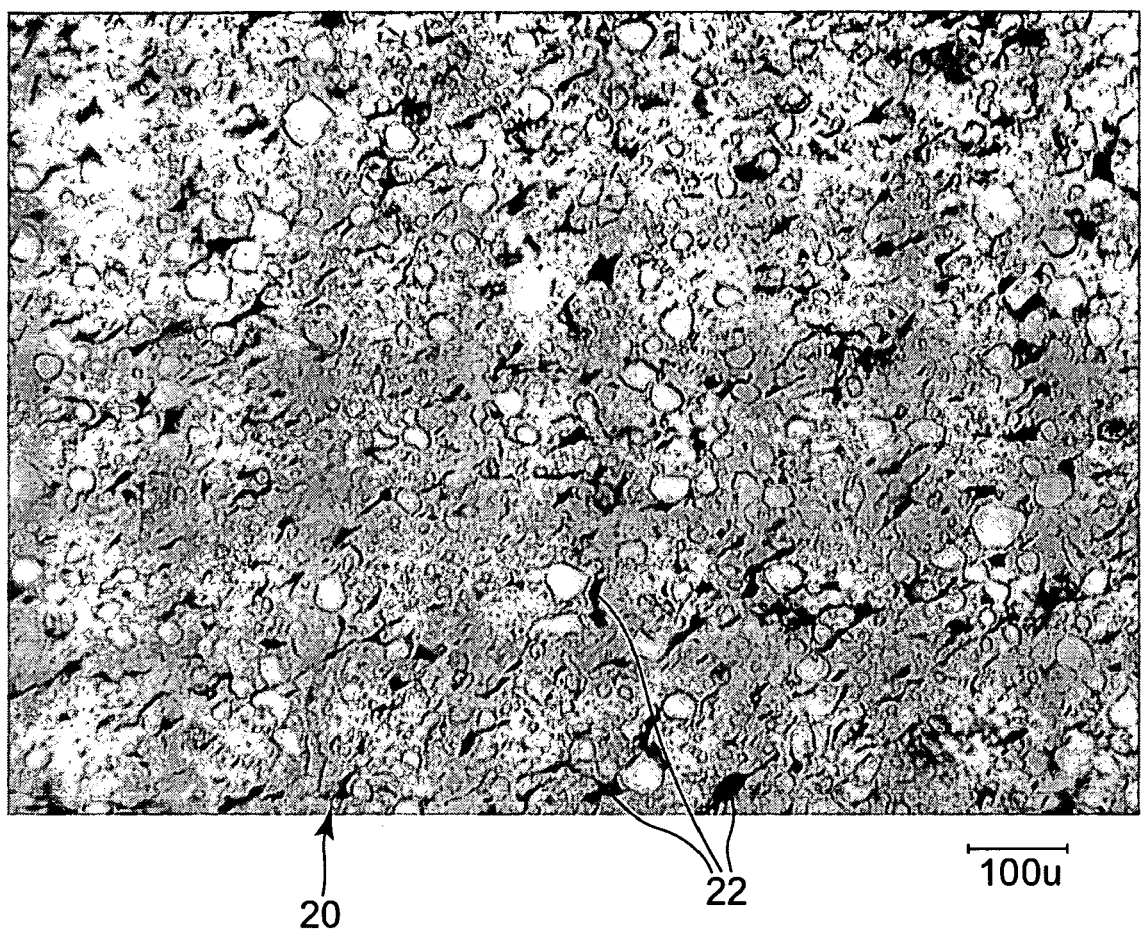
FIG. 2 is a photomicrograph of a cross-sectional view of a comparative cheese composition that includes chemically-modified starch.

FIG. 1 illustrates a cheese composition of the invention and FIG. 2 illustrates a comparative cheese composition. FIGS. 1 and 2 illustrate two cheese compositions that are identical except that the cheese in FIG. 1 includes the combination of non-pregelatinized, thermally-inhibited starch and gluten protein to reduce an amount of casein protein, whereas, the cheese in FIG. 2 includes a chemically modified starch which does not satisfy the Starch Viscosity Test (described below) and does not include the gluten protein. The effective diameter of the starting raw material starches used in FIGS. 1 and 2 were roughly identical.

FIG. 1 is a photomicrograph of a cheese composition 10 using a non-pregelatinized, thermally-inhibited starch (obtained from National Starch and Chemical Company, Bridgewater, N.J., under the trade designation NOVATION 1600) and a non-casein protein (obtained from ADM Food Ingredients under the trade designation PROVIM ESP GLUTEN). Here, the starch granules 12 remain largely intact after processing (e.g., heating and mixing). The starch granules 12 (shown in black) are stained in dark blue from iodine and have a mean area of 780 square micrometers. The average equivalent diameter is 27 micrometers. Equivalent diameter (ED) is a diameter the granule would have if the granule were round. ED can be calculated as two (2) times the square root of the area divided by Pi as follows:

$$ED = 2 \times \sqrt{\frac{Area}{\pi}}.$$

FIG. 2 is a photomicrograph of a comparative cheese composition 20 using a particular chemically-modified starch that does not satisfy the Starch Viscosity Test (described below). Here, the starch granules 22 have degraded relatively more after processing (e.g., heating and mixing) than the non-pregelatinized, thermally-inhibited starch granules used in FIG. 1. The starch granules 22 are stained in dark blue from iodine and have a mean area of 239 square micrometers. The average equivalent diameter is 16 micrometers.

The average granule areas in FIGS. 1 and 2 were obtained using the method for microscopic examination described below. A ½" cube was cut from each cheese sample and frozen. These samples were cut into 20 micrometer sections with a cryostatic microtome. The sections were stained with an aqueous iodine solution. The starch used in these cheeses stains dark blue. Representative fields were imaged in a microscope (obtained from Carl Zeiss International, Oberkochen, Germany under the trade designation ZEISS UNIVERSAL) using transmitted light. Images were acquired with a camera (obtained from Sony Corporation, Tokyo, Japan having model number 760 CCD). The mean starch area was determined with an image analyzer (obtained from Leica Camera AG, Solms, Germany, having model number Leica QWin 550).

Non-pregelatinized, thermally-inhibited starch granules can exhibit an advantageously high resistance to breakdown, e.g., breakdown as the result of heating and/or mixing the granule in a cheese composition. Although not wishing to be bound by theory, it is believed that non-pregelatinized, thermally-inhibited starch tends to improve the internal strength of starch granules which tends to make the starch granules more resistant to physical and/or thermal degradation during one or more cheese making processes. Such resistance to granule degradation can beneficially result in improved processing conditions such as improving cheese composition viscosity during mixing and heating.

Based on this, it is believed that other starch granules tending to have improved internal strength would be expected to work in cheese compositions of the invention. For example, non-pregelatinized, chemically modified starch granules (e.g., non-pregelatinized, cross-linked starch granules) having similar improved internal strength would be expected to work in cheese compositions of the invention. And, in fact, an example in the Examples sections shows that non-pregelatinized, chemically-modified starch can work in the invention.

One method of determining starches useful in the invention is to determine if they satisfy the Starch Viscosity Test, which is described below. Because suitable internal strength (i.e., suitable resistance to granule breakdown) of starch granules is thought to be correlated to desirable viscosity characteristics of a cheese composition of the invention, the Starch Viscosity Test is thought to be a measure of the internal strength of a starch granule.

Starch Viscosity Test

The Starch Viscosity Test can be employed using a Brabender VISCO-AMYLOGRAPH instrument (obtained from C. W. Brabender Instrument, Inc., South Hackensack, N.J.) capable of 75 rpm with a 700 cm gm cartridge. Prior to the Starch Viscosity Test, the starch is analyzed for moisture, so appropriate adjustments due to moisture can be made. For this test, 5% by weight of the total test suspension of starch dry solids are used. To obtain this, 25 grams of starch (dry basis) are weighed and transferred to a beaker. Distilled water is added to provide a total weight of 400 grams to suspend the starch. The suspension is poured into a viscograph bowl. The pH of the suspension is adjusted to 6 via addition of dilute HCl or NaOH. The beaker is rinsed with 100 grams of distilled water minus the weight of the water used for the pH adjustment (total test suspension weight is 500 g). The VISCO-AMYLOGRAPH is started and records viscosity in Brabender units throughout the following heating schedule:

Step 1: Heat suspension at 1.5° C./min from 25 to 95° C. while stirring at 75 rpm, Step 2: Hold starch at 95° C. while stirring for 15 minutes, and Step 3: Cool to 50° C. at 1.5° C./min while stirring.

A starch that satisfies the Starch Viscosity Test is a non-pregelatinized, modified starch that when heated, in a Brabender VISCO-AMYLOGRAPH with a 5% dry solids starch solution having a pH of 6, from 25° C. to 95° C. at a rate of 1.5° C./min exhibits a viscosity in the range from about 100 to about 1200 Brabender units at time=0 (i.e., beginning of the hold period) and exhibits a viscosity in a range from about 200 to about 1400 Brabender units after a 15 minute hold at 95° C.

Figure 3:
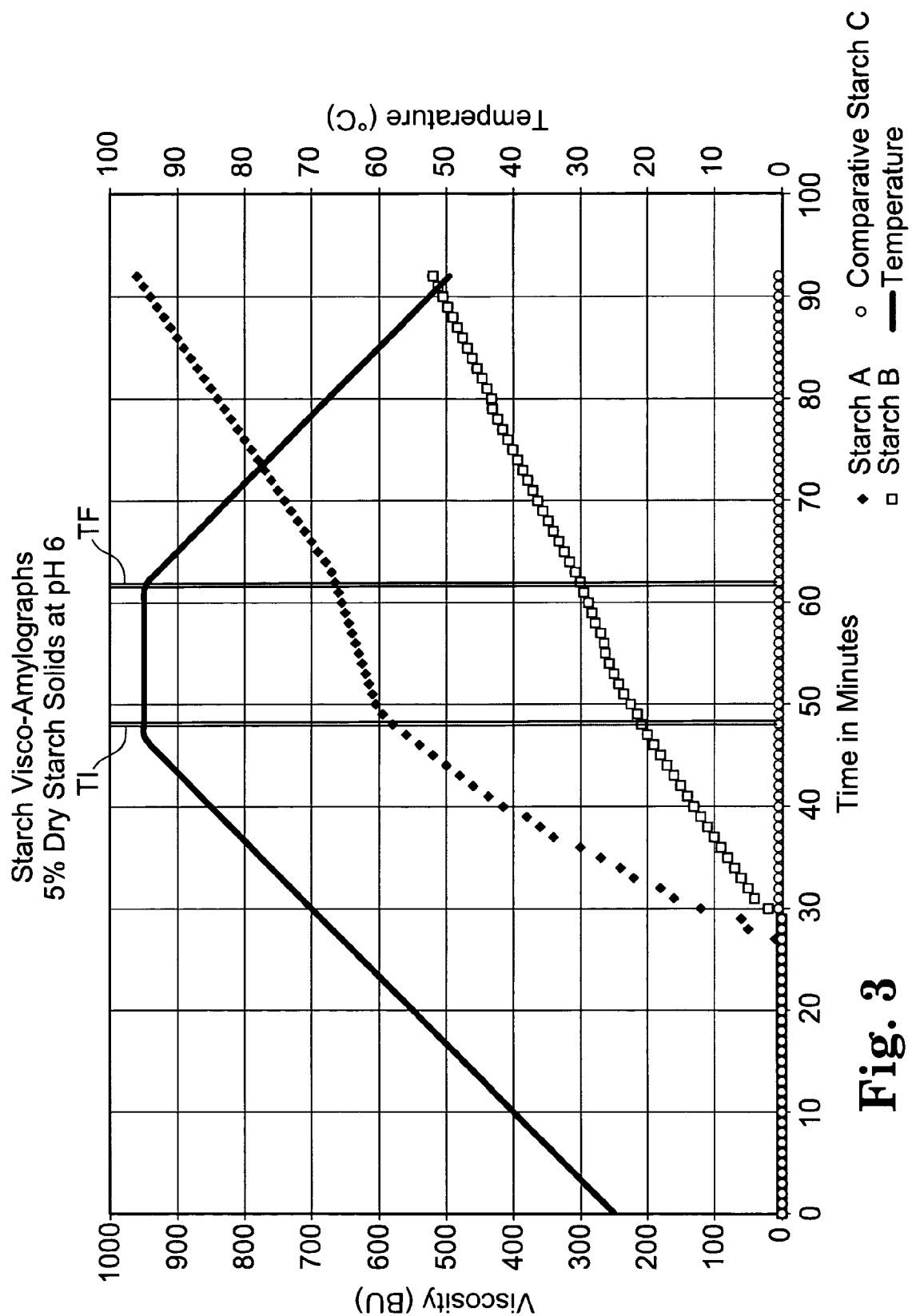
FIG. 3 is a graph showing the results of various starches used in the Starch Viscosity Test.

FIG. 3 illustrates the results of certain starches tested according to the Starch Viscosity Test. "TI" is the beginning of the hold period and "TF" is the end of the hold period. The comparative starch C is a chemically modified starch that does not satisfy the Starch Viscosity Test parameters according to the invention. This starch is the same starch illustrated in FIG. 2 and used as comparative Example 1 in the Examples section. Example Starch A is thermally inhibited potato starch that satisfies the Starch Viscosity Test and is within this invention (this starch is the same starch illustrated in FIG. 1). Starch B is a chemically modified potato starch that satisfies the Starch Viscosity Test and is within this invention.

Thermally-inhibited starch and methods for making it are known and described in U.S. Pat. Nos. 5,725,676; 5,932,017; 6,231,675, the disclosures of which are incorporated herein by reference.

Non-pregelatinized, thermally-inhibited starch is commercially available from, e.g., National Starch and Chemical Company, Bridgewater, N.J., under the trade designation NOVATION 1600.

Suitable amounts of non-pregelatinized, modified starch in the invention include amounts that provide formulation flexibility when used in combination with a protein component according to the invention. For example, preferred amounts of non-pregelatinized, modified starch (e.g., thermally-inhibited starch) include amounts that allow the trans-fat content of the fat component to be low (e.g., about 5% or less by weight of trans fat based on the total weight of the fat component) when the starch is combined with a protein component according to invention. As another example, suitable amounts of starch include a "casein-replacing amount of non-pregelatinized, modified starch." As used herein, a "casein-replacing amount of non-pregelatinized, modified starch" means an amount that would, in combination with a non-casein protein, provide one or more suitable functional and organoleptic properties in a cheese composition. For example, a suitable amount of non-pregelatinized, modified starch can provide similar, if not better, functional characteristics as a given amount of casein protein. Advantageously, such suitable amounts of non-pregelatinized, modified starch provide the ability to formulate cheese compositions with reduced amounts of casein protein because such starch, especially in combination with an amount of non-casein protein, can act as a casein protein substitute. Similarly, as used herein, a "casein-replacing amount of non-pregelatinized, thermally-inhibited starch" means an amount that would, in combination with a non-casein protein, provide one or more suitable functional and organoleptic properties in a cheese composition. Exemplary, suitable amounts of non-pregelatinized, modified starch (e.g., non-pregelatinized, thermally-inhibited starch) include amounts in a range from 1-6% by weight of the total cheese composition, more preferably 2-5%, and even more preferred 2.5-3.5%.

Non-pregelatinized, modified starch can be procured from one or more sources such as corn, potato, sweet potato, wheat, rice, sago, tapioca, and sorghum. Preferred non-pregelatinized, modified starch includes potato starch. Potato starch tends to provide cheese compositions with suitable organoleptic properties such as taste and texture.

One or more emulsifying salts in a cheese composition formulation allow the casein protein to become hydrated.

Exemplary emulsifying salt for use in cheese compositions of the invention include monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, sodium potassium tartrate, and combinations thereof. Preferred emulsifying salt includes one or more of trisodium phosphate, sodium citrate, alkaline sodium aluminum phosphate, and dibasic sodium phosphate.

Emulsifying salt and methods of making the same for use in cheese compositions are well known. One useful emulsifying salt is commercially available from Rhodia Food, Cranbury, N.J., under the trade designation KASAL. KASAL is an emulsifying salt blend of about 70% alkaline sodium aluminum phosphate and about 30% dibasic sodium phosphate.

Exemplary amounts of emulsifying salt in cheese compositions of the invention include an amount less than about 3% by weight of the total cheese composition, preferably less than about 2% by weight of the total cheese composition. In one embodiment, the total amount of one or more emulsifying salts is about 1.9% by weight of the total cheese composition.

Water is preferably used in cheese compositions of the invention. An exemplary amount of water includes an amount of water in the range from about 45% to about 55%, by weight of the total cheese composition.

One or more optional ingredients known in the art may be used with cheese compositions of the invention. Such optional ingredients include acidifying agent, cream, milkfat, cream, milk, salt, harmless artificial coloring, spices or flavorings, mold-inhibitor, nutritional supplements, gums, organic emulsifiers, and other types of cheese than the given cheese composition.

Acidifying agent can include one or more of vinegar, lactic acid, citric acid, acetic acid, and phosphoric acid.

Mold inhibitor can include one or more of the following in a total amount of no more than about 0.2% by weight of the total cheese composition: sorbic acid, potassium sorbate, and sodium sorbate. Mold inhibitor can also include one or more of the following in a total amount of no more than about 0.3% by weight of the total cheese composition: sodium propionate, calcium propionate. Mold inhibitor can also include nisin.

The invention includes methods of making, including methods of formulating, cheese compositions.

In accordance with the invention, it has been discovered that cheese compositions with one or more suitable functional, organoleptic, and/or nutritional characteristics can be formulated with casein protein, non-casein protein and non-pregelatinized, modified starch. In preferred methods, cheese compositions are formulated with vital wheat gluten protein and non-pregelatinized, thermally-inhibited starch.

As mentioned, reducing the amount of casein protein in cheese compositions is desirable for certain cheese compositions. Conventionally, casein protein can be reduced by substituting an amount of casein protein with an amount of certain starches. With such starches, casein protein can be conventionally substituted by starch to a limited extent if certain functional, organoleptic, and/or nutritional characteristics are to be provided. In accordance with the invention, it has been discovered that casein protein can be successfully reduced even further than conventional means by substituting a given amount of casein protein with a suitable amount of non-pregelatinized, modified starch (e.g., non-pregelatinized, thermally-inhibited starch) and non-casein protein (e.g., vital wheat gluten) so that suitable unsubstituted, casein-like characteristics of the cheese composition are achieved. In other words, the invention includes a method of formulating a cheese composition that includes reducing an amount of casein protein in a cheese composition by incorporating both a non-casein protein and non-pregelatinized, modified starch into a cheese composition to replace an amount of casein protein.

In a preferred embodiment, a method of formulating a cheese composition includes the step of reducing an amount of a casein protein in a formulation by incorporating a non-casein protein into the formulation for the composition based upon information comprising functional characteristics of the non-casein protein and by incorporating a non-pregelatinized, modified starch into the formulation for the composition based upon information comprising data indicative of a viscosity characteristic of the non-pregelatinized, modified starch. Viscosity characteristics of a non-pregelatinized, modified starch can be readily obtained using well-known methods. Preferably, viscosity data is obtained for non-pregelatinized, modified starch using the Starch Viscosity Test described above.

In an embodiment, a method of formulation includes formulating the casein protein in an amount in a range from 10-20% by weight of the total cheese composition, the non-casein protein in an amount in a range from 1-4% by weight of the total cheese composition, and the non-pregelatinized, modified starch in an amount in a range from 1-6% by weight of the total cheese composition.

Reducing an amount of a casein protein in a formulation by incorporating a non-casein protein into the formulation for the composition can also be based upon information including nutritional characteristics of the non-casein protein (e.g., using a non-casein protein that has similar nutritional characteristics as a casein protein).

In certain embodiments, such cheese compositions can be formulated with a fat component having an extremely low trans-fat content (e.g., about 5% or less by weight of trans fat based on the total weight of the fat component). Fat ingredients having low trans-fat content can be identified as having an acceptable Solid Fat Content at one or more temperatures as determined by, e.g., the Solid Fat Content procedure described below and discussed above with respect to FIG. 4.

The invention also includes methods of making cheese compositions that include the steps of, e.g., formulating cheese composition ingredients including a fat component, a casein-replacing amount of non-casein protein, a casein-replacing amount of non-pregelatinized, modified starch, an emulsifying salt component, and a water component, combining the ingredients, followed by mixing, heating, and cooling to form a cheese composition. In one embodiment, the non-pregelatinized, modified starch includes non-pregelatinized, thermally-inhibited, potato starch. In another embodiment, the non-casein protein includes vital wheat gluten.

Methods of making a cheese composition of the invention generally utilize a cheese cooker, which are commercially available and well known. An example of such a cooker includes a variable speed, twin screw, steam injected cheese cooker from Custom Stainless Steel Equipment, Santa Rosa, Calif., having model CDB-0412FJD.

In general, the cheese cooker system is allowed to warm up. Next, ingredients are added to the cooker and the ingredients are heated. Ingredients can be added in one group, or at different times. The ingredients are then mixed, while the temperature is maintained at an elevated state. The ingredients are then cooled to form a final cheese composition product. A more specific description of an example of how a cheese composition of the invention can be made using a cheese cooker having model number CDB-0412FJD from Custom Stainless Steel Equipment, Santa Rosa, Calif., is given below.

First the cheese cooker can be readied by setting the steam to a pressure of about 40 psi. Condensate valves can then be opened to allow the steam to flow through the pipes. Once the condensate has been cleared, the steam is directed through the cheese cooker by closing the steam outlet valve. The steam is sent through the injection ports to ensure that the ports are open and unplugged.

The cover to the mixer portion of the cheese cooker is then closed and the cheese cooker is allowed to warm up. After the mixer has been sufficiently heated, the steam valves on the cheese cooker are closed. Some of the ingredients, if necessary, can be mixed separately, or melted. For example, if semi-solid shortening is used, it may need to be melted before being added to the cooker. Typically, water is added to the cooker and allowed to warm to a desired temperature before adding other ingredients.

The steam drain valves on the cheese cooker are opened again to clear condensate, the agitator is started and the water is added to the cooker. The steam valves are then opened and steam is allowed to enter the cooker through the injection ports. The cover is closed and the temperature is allowed to rise to a temperature in the range from about 175° F. to about 200° F. (about 79° C. to about 93° C.) while mixing is maintained.

Once the water is heated, emulsifier salt can be added and allowed to dissolve before the separately mixed portion(s) are added to the cheese cooker. The agitation speed is controlled to ensure proper mixing. If the temperature of the ingredients has lowered, the ingredients are heated to a temperature in the range from 175° F. to 185° F. (about 79° C. to about 85° C.) by closing the mixer cover and adding more steam to the cooker. Caution should be taken in order to prevent addition of an excessive amount of steam, which could cause addition of too much water to the overall mixture. The steam is then shut off and the cover opened to allow visual confirmation of a final cheese composition product. The mixer should remain running in order to obtain a homogenous mixture. The temperature should be maintained at about 170° F. (about 76° C.). The cheese should begin to solidify and a creamy texture should result. The transformation should occur between 2 and 8 minutes after the last ingredient has been added to the cooker. When the formation of the cheese is complete, the molten cheese is drained into an appropriate container. The final cheese composition can then cool to a temperature in the range from about 32° F. to about 40° F. (about 0° C. to about 5° C.) and can then be further processed if desired.

Cheese compositions of the invention are typically used as edible food products and/or are further processed and ultimately formed into cheese compositions that can be used as edible food products. Cheese compositions can be used at one or more stages during cheese manufacturing such as, as described above, mixing, heating, and cooling cheese compositions.

Final cheese products of the invention can be packaged alone or combined with other food products before packaging. Final cheese products packaged alone include string cheese, shredded cheese (e.g., shredded mozzarella cheese and shredded cheddar cheese), and block cheese. Final cheese products can be combined with other food products before being packaged. Such cheese products can be incorporated or combined with other food products in any suitable way. For example, final cheese products of the invention can be applied in any suitable form (e.g., shredded) onto other food products such as pizza by any suitable, conventional means. As another example, final cheese products of the invention can be injected in any suitable form into other food products that include cheese (e.g., snack food including pizza-type snack food and the like) by any suitable, conventional means. Cheese compositions of the invention can also be packaged, alone or in combination with other food ingredients, frozen, and refrigerated stored for delayed use and/or consumption.

In certain preferred embodiments, a cheese composition of the invention and/or food products including the same can be marketed as having low and/or comparatively reduced levels of trans-fat content. For example, a packaged food product including a cheese composition of the invention can include indicia such as labeling that identifies at least the cheese composition as having a low amount of trans-fat (e.g., about 2% or less of trans-fat by weight of the fat component). Or, the packaged food product could have labeling that indicates that the cheese composition has comparatively reduced amount of trans-fat content yet is able to provide one or more desirable properties such as excellent melt, texture, combinations of these, and the like. Advantageously, providing such cheese compositions can provide a desirable product in the industry.

Test Protocols

A. Determination of Solid Fat Content of a Fat Ingredient

As used herein, the term "Solid Fat Content" means the weight percent of solid fat based on the total weight of a given fat ingredient at a particular temperature. A fat ingredient can be measured for Solid Fat Content using a Bruker Minispec using the American Oil Chemist's Society (AOCS) Official Method Cd 16b-93 revised 1999, Solid Fat Content (SFC) by Low-Resolution Nuclear Magnetic Resonance—The Direct Method.

B. Determination of Stretch Test Value for a Cheese Composition

As used herein, the term "Stretch Test Value" means the value assigned to a cheese composition after applying the following test protocol on the cheese. An oven is preheated to 450° F. A wedge of cheese is sliced to a thickness of about 0.5 inches. A disc-shaped piece of cheese is cut from the wedge using a metal circular cutter (39.2 mm diameter, 7.3 mm deep). The weight of the disc of cheese should be between 8.5 and 8.9 grams (trim disc with circular cutter if needed). The disc of cheese is then placed in the center of a 15 mm×100 mm glass Petri dish. Then the cover of the Petri dish is placed over the Petri dish and the dish is placed in the oven for exactly 5 minutes. The Petri dish is then removed from the oven and allowed to cool for about 30 seconds. The cover is removed and a fork is wedged into the cheese disc and pulled upwards so as to stretch the cheese. The length that the cheese can be stretched until breaking is measured and recorded. A good sample will have a Stretch Test Value of 15 inches or more. The appearance of the cheese disc is also observed and recorded. A satisfactory cheese should not be burnt and a minimum to no amount of free oil or water should be visible.

C. Determination of Melt Test Value for a Cheese Composition

As used herein, the term "Melt Test Value" means the value assigned to a cheese composition after applying the following test protocol on the cheese. The procedure for determining a Melt Test Value is as similarly described above with respect to determining a Stretch Test Value with the added steps of measuring the "spread" of the cheese after it has been baked. Two perpendicular measurements of spread are taken and averaged in millimeters and converted into a Melt Test Value according to the following conversions:

| mm | Melt Test Value | mm | Melt Test Value |
| --- | --- | --- | --- |
| 39.8 | 1 | 43.05 | 1.5 |
| 46.3 | 2 | 49.55 | 2.5 |
| 52.8 | 3 | 56.05 | 3.5 |
| 59.3 | 4 | 62.55 | 4.5 |
| 65.8 | 5 | 69.05 | 5.5 |

-continued

| mm | Melt Test Value | mm | Melt Test Value |
| --- | --- | --- | --- |
| 72.3 | 6 | 75.55 | 6.5 |
| 78.8 | 7 | 88.55 | 7.5. |

An acceptable Melt Test Value includes such values greater than or equal to 3.5.

D. Determination of Crumble Test Value for a Cheese Composition

As used herein, the term "Crumble Test Value" means the value assigned to a cheese composition after applying the following test protocol on the cheese. Cut cheese into large cubes and then shred the cubed samples using a Hobart shredder. Take a handful of the shredded cheese and squeeze the shreds firmly into the shape of a ball with the palm side of hand. Then rub the cheese ball firmly with the other hand over a container and rate the appearance of the shreds. A perfect shred will maintain its shape under moderate stress and therefore have a Crumble Test Value of 1. A poor shred will crumble into small pieces under small stress and therefore have a Crumble Test Value of 5. Acceptable levels of crumbliness are 1-2.5.

E. Determination of Stickiness Test Value for a Cheese Composition

As used herein, the term "Stickiness Test Value" means the value assigned to a cheese composition after applying the following test protocol on the cheese. Cut cheese into large cubes and then shred the cubed samples using a Hobart shredder. Take a handful of the shredded cheese and squeeze the shreds firmly into the shape of a ball with the palm side of hand. Then bounce the cheese ball several times in hand over a container. A perfect shred will fall apart easily into its original shreds and therefore have a Stickiness Test Value of 1. A poor shred will stick to the other shreds and therefore have a Stickiness Test Value of 5. Acceptable levels of stickiness are 1-2.5.

F. Determination of Firmness Test Value for a Cheese Composition

As used herein, the term "Firmness Test Value" means the value assigned to a cheese composition after applying the following test protocol on the cheese. A Firmness Test Value can be obtained from a Haake rheometer having model number RV12. An acceptable Firmness Test Value includes a torque measurement in the range from 60 to 80%.

Representative embodiments of the invention will now be described with reference to the following examples that illustrate the principles and practice of the invention.

EXAMPLES

Example 1

Example 1-1 illustrates how casein protein content in a substitute cheese composition can be reduced by adding in an amount of non-casein protein (e.g., vital wheat gluten) and non-pregelatinized, thermally-inhibited starch. Example 1-2 illustrates how casein protein content in a substitute cheese composition can be reduced by adding in an amount of non-casein protein (e.g., vital wheat gluten) and non-pregelatinized, chemically modified starch. Example 1-1 corresponds to Starch A in FIG. 3, while Example 1-2 utilizes Starch B in FIG. 3. The composition of Comparative Example 1 is not included within this invention and utilizes Comparative Starch C in FIG. 3.

TABLE 1

Compositions of Examples in Example 1

|  | Comparative Example 1 | Example 1-1 | Example 1-2 |
|---|---|---|---|
| Stage 1 | | | |
| water plus steam | 46.50% | 46.50% | 46.50% |
| Stage 2 | | | |
| KASAL | 1.60% | 1.60% | 1.60% |
| sodium citrate | 0.20% | 0.20% | 0.20% |
| tri sodium phosphate | 0.20% | 0.20% | 0.20% |
| Stage 3 | | | |
| rennet casein | 19.30% | 17.50% | 17.50% |
| vital wheat gluten | | 2.00% | 2.00% |
| soy oil | 25.80% | 26.10% | 26.10% |
| salt (NaCl) | 1.00% | 1.00% | 1.00% |
| potato starch C | 3.30% | | |
| potato starch A | | 2.80% | |
| potato starch B | | | 2.80% |
| potassium chloride (KCl) | 0.90% | 0.90% | 0.90% |
| citric Acid | 0.50% | 0.50% | 0.50% |
| potassium sorbate | 0.20% | 0.20% | 0.20% |
| vitamin/mineral blend | 0.05% | 0.05% | 0.05% |
| Total | 100.00% | 100.00% | 100.00% |

TABLE 2

Source of Ingredients in TABLE 1

| Ingredient | Product Name | Company |
|---|---|---|
| 70% sodium aluminum phosphate & 30% sodium phosphate | KASAL | Rhodia Food, Cranbury, NJ |
| sodium citrate | | A. E. Staley Mfg. Co., Decatur, IL |
| tri-sodium phosphate | | Rhodia Food, Cranbury, NJ |
| rennet casein | | Kerry Ingredients, Beloit, WI |
| vital Wheat gluten | PROVIM ESP | ADM Food Ingredients, Keokuk, IA |
| soy oil | | A. C. Humko, Columbus, OH |
| salt (NaCl) | | Morton International, Inc of Rohm and Haas, Philadelphia, Penn. |
| modified potato starch | PENBIND 850 | Penford Food Ingredients, Englewood, CO |
| thermally inhibited potato starch | NOVATION 1600 | National Starch an Chemical Co, Bridgewater, NJ |
| modified potato starch | PENCLING 580 | Penford Food Ingredients, Englewood, CO |
| potassium chloride (KCl) | | Morton International, Inc of Rohm and Haas, Philadelphia, Penn. |
| citric acid | | A. E. Staley Mfg. Co., Decatur, IL |
| potassium sorbate | | Chisso Corp, Tokyo, Japan |
| vitamin mineral blend | | Watson Foods Co., Inc., West Haven, CT |

The cheese compositions in Example 1 were prepared according to the procedure described below. A 5 kg cheese cooker (obtained from Custom Stainless Steel Equipment, Santa Rosa, Calif., having model number CDB-0412FJD) was used. The stage two emulsifying salts (KASAL, sodium citrate, and tri-sodium phosphate) were weighed separately and temporarily kept aside. The casein blend ingredients (stage 3 ingredients) were weighed and combined together. The main steam valve on the cooker was opened to allow steam to go through injection ports in the cooker to warm the cooker and drain condensate. The water ingredient was weighed, poured into the cooker, and heated to 175 ° F. After heating the water, the emulsifying salts (stage 2 ingredients) were added to the water. The casein blend ingredients (stage 3 ingredients) were separately mixed and warmed to 110° F. The fat in the casein blend should have been melted after mixing the casein blend at 110° F. Then the casein blend was added to the cooker and timing started. The mixing speed on the cooker was set to medium-high. The ingredients in the cooker were heated to 180° F. After heating the cheese ingredients, the steam was turned down. The mixture should never go above 185° F., but the steam valve was periodically adjusted so that the temperature of the mixture was maintained at about 175° F. At the beginning of mixing, the cheese tends to be grainy, but becomes smooth as mixing proceeds. The final cheese composition product was formed when the mixture became very thick and strands and air bubbles formed. After the final cheese composition formed, it was cooked for about one (1) minute longer. Then the steam and mixer are turned off and time recorded. The cheese can then be drained from the cooker into an appropriate container and covered. The final cheese composition was stored in the refrigerator and evaluated the next day.

As can be seen, Example 1-1 has a reduced amount of casein protein (as compared to Comparative Example 1) by adding in an amount of vital wheat gluten protein and non-pregelatinized, thermally-inhibited starch. Example 1-2 has a reduced amount of casein protein (as compared to Comparative Example 1) and uses chemically modified starch. The cheese compositions were evaluated for certain properties (e.g., cook time, meltability and machinability), and all of the results were found to be acceptable and similar.

Example 2

The following example compares a cheese composition having a relatively high trans fat content (Example 2-1) to the same cheese composition having the high trans-fat ingredient substituted with a relatively low trans-fat ingredient (Examples 2-2 to 2-5). The results show that a cheese composition of the invention allows tremendous formulation flexibility by allowing the fat component to have relatively and desirably low trans fat content while at the same time maintaining cheese composition properties of melt, crumble, stretch, and firmness. The properties of melt, crumble, stretch, and firmness indicated in Table 5 below were determined according to the appropriate test protocol described above. Example 2-1 is a control sample having the formulation indicated below in Table 3. Examples 2-2 to 2-5 are multiple runs of the same formulation as indicated in Table 3. The cheese compositions of Examples 2-1 to 2-5 are the same as Example 1-1 shown in Table 1 except for the fat ingredient. Some of the properties among Examples 2-2 to 2-5 varied due to variations in processing (e.g., variation in shear rate of cheese composition in the cooker).

TABLE 5

Examples 2-1 to 2-4

| | Form Time (min:s) | Dump Time (min:s) | Moist. % | pH | On On 10-7% Firmness (Torque) | Time to Peak (sec) | Temp (° F.) | Melt good >3.5 | Stretch (in) 5 min bake, 30 sec cool | Sticky (5 = poor) | Crumble (5 = poor) | Pizza Bake Com. |
|---|---|---|---|---|---|---|---|---|---|---|---|---|
| 2-1 Control | 1:15 | 4:30 | 50.19 | 6.38 | 63 | 15 | 41 | 3.4 | 12.8 | 1.0 | 1.0 | Ok, atypically noodly |
| 2-2 | 1:00 | 4:30 | 50.35 | 6.42 | 74 | 16 | 41 | 3.3 | 18.5 | 1.0 | 2.0 | Some noodles. Okay melt. |
| 2-3 | 1:30 | 4:30 | 50.67 | 6.43 | 69 | 18 | 40 | 3.0 | 16.5 | 1.0 | 2.0 | Some noodles. Good melt |
| 2-4 | 1:00 | 4:30 | 50.69 | 6.38 | 68 | 15 | 43 | 3.5 | 20.3 | 1.0 | 2.5 | Some noodles. Good melt. |
| 2-5 | 1:15 | 4:30 | 50.70 | 6.35 | 76 | 17.67 | 41 | 3.3 | 8.00 | 1.0 | 2.0 | |

Example 3

Example 3 shows performance data for various cheese compositions in Table 7 below (runs 2-9) that have substituted a different single system fat ingredient for control fat ingredient 218744 (run 1). The cheese compositions of runs 1-9 are the same as Example 1-1 shown in Table 1 except for the fat ingredient.

TABLE 6

Fat ingredients for cheese compositions in Table 8

| Variable | Description | Saturate % | Trans % |
|---|---|---|---|
| Control 218744 | Partially hydrogenated soy | 17% target | 35% target |
| 218709 | Partially hydrogenated soy | 17% target | 21% target |
| SPMF/SSF | Palm oil and fractions | 55% | 0% |
| SPMF/SSF | Palm oil and fractions | 65% target | 0% target |
| Palm Kernel | Palm kernel | 82% | 0.00 |
| Interesterified | Soy | 48% | 1% |
| 218706- Corn Oil | Corn | 13% target | 1% target |
| 218706- Corn Oil, high starch | Corn with higher starch level to firm | 13% target | 1% target |

TABLE 7

Performance Data for Example 4 Cheese Compositions

| Run | Variable | Oil Type | pH | Firmness (% Torque) | Time to Peak (sec) | Temp (deg F.) | Melt >3.5 | Stretch (in) 30 sec-1 min cooling | Sticky Rating 5 = poor | Crumble Rating 5 = poor | Pizza Bake Comments |
|---|---|---|---|---|---|---|---|---|---|---|---|
| 1 | Control 218744 | partially hydrogenated soy | 6.28 | 59.5 | 16.0 | 43.0 | 4.0 | 9.0 | 1.5 | 1.5 | okay/good melt, brown crispies, chewy, surface oil, melt typical |
| 2 | SPMF/SSF | palm oil and fractions | 6.25 | 61.0 | 16.0 | 42.0 | 4.0 | 10.0 | 1.0 | 2.0 | good melt, stretch, chewy, good browning, soft, more cheese |
| 3 | IE Interesterified fat | interesterified soy | 5.74 | 74.0 | 16.0 | 42.0 | 3.8 | 8.3 | 2.5 | 2.0 | slimy cheese, brown crispies, poor melt, firm, good mouth feel |
| 4 | 218709 Oil | partially hydrogenated soy | 6.08 | 32.0 | 20.0 | 41.0 | 4.4 | 7.8 | 1.0 | 2.5 | slimy, moist, typical melt, too soft, noodly melt on edges, bad melt, slight orange coloration, brown |
| 5 | Palm Kernel | palm kernel | 6.26 | 55.0 | 18.0 | 42.0 | 3.8 | 6.0 | 1.0 | 1.5 | dry, chewy, defined melted shred, brown crispies, soft |
| 6 | Control 218744 | partially hydrogenated soy | 6.3 | 69 | 15 | 43 | 3.9 | 14.0 | 1.5 | 1.5 | noodly melt |

TABLE 7-continued

Performance Data for Example 4 Cheese Compositions

| Run | Variable | Oil Type | pH | Firmness (% Torque) | Time to Peak (sec) | Temp (deg F.) | Melt >3.5 | Stretch (in) 30 sec-1 min cooling | Sticky Rating 5 = poor | Crumble Rating 5 = poor | Pizza Bake Comments |
|---|---|---|---|---|---|---|---|---|---|---|---|
| 7 | SPMF/SSF | palm oil and fractions | 6.4 | 93 | 17 | 44 | 3.4 | 11.5 | 1.0 | 3.0 | good texture, darker color from color, slightly noodly melt, dry |
| 8 | 218706- Corn Oil | corn | 6.3 | 27 | 18 | 43 | 3.8 | 9.5 | 2.5 | 2.0 | more yellow than control, comparable to control, good |
| 9 | 218706- Corn Oil, high starch | corn | 6.3 | 27 | 19 | 42 | 3.1 | 9.0 | 2.5 | 2.0 | good texture, more yellow than control, most comparable, poor, noodly melt, slight flavor |

In Example 3, unsaturated oil (e.g., cottonseed, corn) produced slimy, soft cheese with poor machinability, and poor melt. A higher starch level was also tested in the formula made with corn oil, but this formulation change did not add sufficient hardness to the cheese. The use of unsaturated, non-hydrogenated oil would be a good alternative from a nutritional perspective because of low saturate and trans levels. The single system, highly saturated fats (e.g., palm kernel, palm oil with palm fractions) in Example 3 tended to produce cheese that was too hard with poor texture, melt, and atypical performance on pizzas.

Example 4

Table 8 shows performance data for Example 4 cheese compositions having the different blends of cottonseed oil/SPMF/SSF oil shown in FIG. 4 (discussed above). The various cheese compositions of Example 4 are the same as Example 1-1 shown in Table 1 except for the fat ingredient.

TABLE 8

| Variable | | | Firmness | | | Melt | Stretch (in) | Sticky | Crumble | |
|---|---|---|---|---|---|---|---|---|---|---|
| Cottonseed (CS) | SPMF/SSF | pH | On 10-7% Torque | Time to Peak (s) | Temp (deg F.) | (good is >3.5) | (5 min cook, 30 sec cool) | Rating 5 = poor | Rating 5 = poor | Pizza Bake Comments |
| 0% | 100% | 6.33 | 95 | 16 | 39 | 3.5 | 8.5 | 2.0 | 2.5 | |
| 25% | 75% | 6.30 | 90 | 16 | 40 | 2.9 | 12.9 | 2.0 | 2.3 | good melt, typical |
| 33% | 66% | 6.33 | 58 | 15 | 41 | 3.6 | 14.3 | 2.2 | 2.4 | dried out, atypical melt |
| 40% | 60% | 6.18 | 65 | 15 | 40 | 3.5 | 13.5 | 1.8 | 2.3 | typical, good |
| 50% | 50% | 6.34 | 57 | 16 | 40 | 3.2 | 13.5 | 2.0 | 2.3 | ok melt, yellow/orange |
| 100% | 0% | 6.32 | 25 | 16 | 38 | 3.2 | 8.3 | 1.5 | 2.0 | |

The 25% CS/75% SPMF/SSF and 50% CS/50% SPMF/SSF ranked consistently well in pizza bake ups. The 50% CS/50% SPMF/SSF had marginal hardness and presents potential problems with machinability, while the 40% CS/60% SPMF/SSF yielded good machinability, and consistently acceptable pizza bake up results. The use of CS and SPMF/SSF together can reduce trans fat, and keep saturate levels lower than could be obtained otherwise with only SPMF/SSF. The 40% CS/60% SPMF/SSF is a preferred oil replacement system for a cheese composition according to the invention.

All patents, patent documents, and publications cited herein are incorporated by reference as if individually incorporated. Unless otherwise indicated, all parts and percentages are by weight of the total composition. The foregoing detailed description has been given for clarity of understanding only. No unnecessary limitations are to be understood there from. The invention is not limited to the exact details shown and described, for variations obvious to one skilled in the art will be included within the invention defined by the claims.

What is claimed is:

1. A low trans-fat cheese composition having suitable functional, organoleptic and nutritional properties, comprising:
   a fat component having about 5% or less by weight of trans-fat based on the total weight of the fat component, the fat component having a Solid Fat Content value in the range from about 30% to 50% at 10 degrees Celsius and less than about 10% at 37.8 degrees Celsius;
   a protein component comprising:
     casein protein; and
     a casein-replacing amount of non-casein protein; and
   a starch component comprising a casein-replacing amount of non-pregelatinized, modified starch.

2. The low trans-fat cheese composition of claim 1, wherein the fat component comprises one or more fat ingredients selected from the group consisting of palm oil, palm oil fractions, and combinations thereof.

3. The low trans-fat cheese composition of claim 1, wherein the cheese composition has a Melt Test Value greater than or equal to 3.5.

4. The low trans-fat cheese composition of claim 1, wherein the cheese composition has a Stretch Test Value of at least fifteen inches.

5. The low trans-fat cheese composition of claim 1, wherein the cheese composition has a Crumble Test Value in the range from 1.0 to 2.5.

6. The low trans-fat cheese composition of claim 1, wherein the cheese composition has a Firmness Test Value in the range from 60% to 80% torque.

7. The low trans-fat cheese composition of claim 1, wherein the casein protein is present in an amount in the range from 10-20% by weight of the cheese composition.

8. The low trans-fat cheese composition of claim 1, wherein the non-pregelatinized, modified starch comprises non-pregelatinized, thermally-inhibited starch.

9. The low trans-fat cheese composition of claim 8, wherein the non-pregelatinized, thermally-inhibited starch is present in an amount in the range from 1-6% by weight of the cheese composition.

10. The low trans-fat cheese composition of claim 8, wherein the non-pregelatinized, thermally-inhibited starch comprises non-pregelatinized, thermally-inhibited, potato starch.

11. The low trans-fat cheese composition of claim 1, wherein the non-casein protein comprises non-dairy protein.

12. The low trans-fat cheese composition of claim 11, wherein the non-dairy protein comprises vital wheat gluten protein.

13. The low trans-fat cheese composition of claim 1, wherein the non-casein protein is present in an amount in the range from 1-4% by weight of the cheese composition.

14. The low trans-fat cheese composition of claim 1, wherein the non-pregelatinized, modified starch comprises non-pregelatinized, chemically modified starch.

15. The low trans-fat cheese composition of claim 14, wherein the non-pregelatinized, chemically modified starch is present in an amount in the range from 1-6% by weight of the cheese composition.

16. The low trans-fat cheese composition of claim 14, wherein the non-pregelatinized, chemically modified starch comprises non-pregelatinized, chemically modified, potato starch.

17. The low trans-fat cheese composition of claim 1, wherein the non-pregelatinized, modified starch has a viscosity value, according to the Starch Viscosity Test using 5% dry starch solids, in the range from 100-1200 Brabender units at the beginning of a 95° C. hold period and in the range from 200-1400 Brabender units after 15 minutes from the beginning of the hold period.

18. The low trans-fat cheese composition of claim 1, wherein the casein protein comprises rennet casein protein.

19. The low trans-fat cheese composition of claim 1, wherein the cheese composition is a substitute cheese composition.

20. A packaged food product comprising the low trans-fat cheese composition of claim 1, wherein the packaged food product includes labeling that identifies the food product as having reduced trans-fat.

21. The packaged food product of claim 20, wherein the food product is a frozen snack food.

22. A method of formulating a low trans-fat cheese composition while maintaining suitable functional, organoleptic and nutritional properties comprising:

selecting a low trans-fat component having about 5% or less by weight of low trans-fat based on the total weight of the fat component by comparing a Solid Fat Content profile of the low trans-fat component to a base-line Solid Fat Content profile of an exemplary fat having greater than 5% trans-fat based on the total weight of the exemplary fat, the Solid Fat Content profile of the low trans-fat component depicting a Solid Fat Content value for the low trans-fat component in the range from about 30% to 50% at 10 degrees Celsius and less than about 10% at 37.8 degrees Celsius;

selecting a protein component including casein protein and a casein-replacing amount of non-casein protein; and selecting a starch component including a casein-replacing amount of non-pregelatinized, modified starch.

* * * * *